United States Patent [19]

King

[11] 4,146,683
[45] Mar. 27, 1979

[54] SULFUR CELL CONSTRUCTION AND METHOD

[75] Inventor: Randall N. King, Johnstown, N.Y.

[73] Assignee: Electric Power Research Institute, Inc., Palo Alto, Calif.

[21] Appl. No.: 848,443

[22] Filed: Nov. 4, 1977

[51] Int. Cl.² .................................... H01M 10/39
[52] U.S. Cl. ................................ 429/104; 429/126; 429/164
[58] Field of Search ............... 429/104, 31, 102, 101, 429/163, 218, 191, 193, 209, 126

[56] References Cited

U.S. PATENT DOCUMENTS

| | | | |
|---|---|---|---|
| 3,770,502 | 11/1973 | Nakabayashi | 429/104 |
| 3,883,367 | 5/1975 | Chiku et al. | 429/104 |
| 3,982,957 | 9/1976 | Jones et al. | 429/163 |
| 4,035,553 | 7/1977 | Evans et al. | 429/104 |

Primary Examiner—Anthony Skapars
Attorney, Agent, or Firm—Flehr, Hohbach, Test, Albritton & Herbert

[57] ABSTRACT

An improved method and means for allowing a sodium sulfur cell to become more fully charged employs a wrapping of a plain-woven natural fabric reduced in a vacuum furnace to carbon. The wrapping of woven carbon is interposed between a sulfurous electrolyte and the outside surface of a sodium electrolyte container.

10 Claims, 1 Drawing Figure

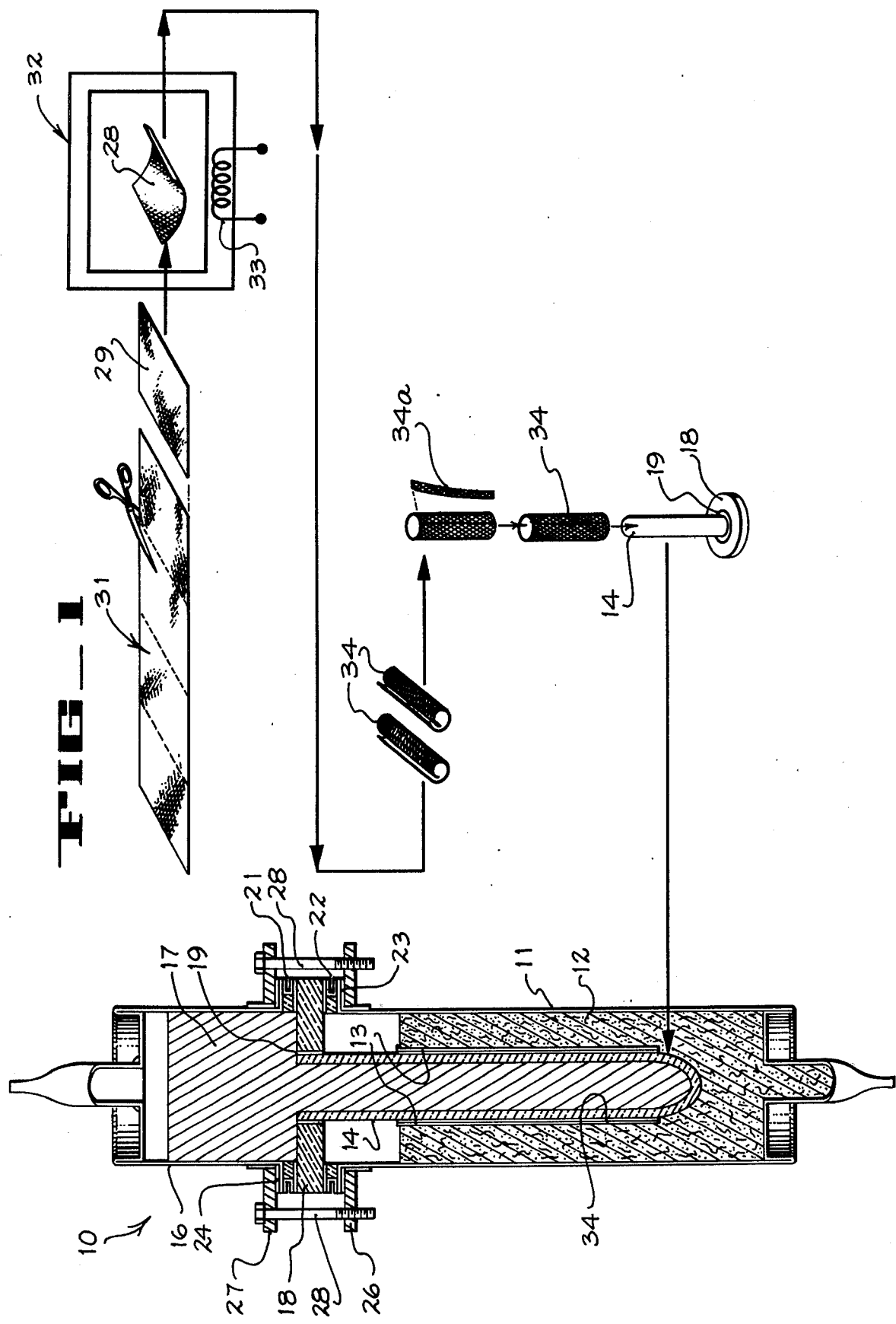

SULFUR CELL CONSTRUCTION AND METHOD

BACKGROUND OF THE INVENTION

This disclosure relates to an improved device which allows a sodium sulfur cell to become more fully charged and to a method of constructing same.

It has been observed that as a sodium sulfur cell becomes charged there develops a region where two phases are present in the sulfur electrode, namely sodium polysulfide and sulfur. As the charge continues, the sulfur preferentially forms around the beta electrolyte tube. Since the sulfur is an insulator, greater and greater voltages become necessary in order to charge the cell whereupon a point is soon reached as to be harmful to the cell. This reaction may occur immediately following the initial formation of the sulfur.

It is known that this preferential formation of sulfur around the beta electrolyte tube may be considerably delayed by placing a more resistive layer of current collector, than is in the remainder of the positive (sulfur) electrode, about the beta electrolyte tube. This layer may be of a material which is wetted by both sulfur and sodium polysulfide. Also, the material must be inert to the cell atmosphere. A type of graphite mat has previously been employed for this purpose.

However, certain problems exist in the use of the graphite mat. Initially, the mat consists of very delicate fibers of graphite which are prepared to a size of 7cm × 2cm weighing 0.05 grams. The weight is very critical to cell performance. Heavier mats placed into cells give high resistance to the cell while lower weights do not allow the cell to be charged into the two-phase region thereof. In addition, the method of preparing such mats presently includes cutting to a 7cm × 2cm size with a razor blade and then peeling off laminates of the fibrous mat. In conducting this operation a person's individual judgment is employed as to the proper thickness of the laminate and then the pieces are weighed with the hope that the weight will be correct.

Since the portions of the laminate are very delicate, if the pieces are underweight they can not be brought up to the correct weight by adding more mat material. If they are overweight, it is very difficult to peel off any more graphite from the mat since it is structurally very weak. Therefore, it is evident that there is a significant difficulty in working with the delicate mat material. In any large scale production of these devices the problems become greater as the mat is inconsistent in its structure and will therefore present a varying resistance in its cross-section. Its delicate physical makeup presents severe handling problems.

Fiberglass sleeves have been attempted to be used in cells of the kind described, but it has been observed that the silica which is present can be harmful to the cell. Furthermore, tests have shown that the original graphite mat gives superior performance compared to the fiberglass sleeves.

OBJECTS AND SUMMARY OF THE INVENTION

In general it is an object of the present invention to provide an improved sodium sulfur cell construction having improved means for delaying the formation of sulfur around the beta alumina electrolyte tube and a method of manufacturing same.

Another object of the invention is to provide a more workable material than heretofore employed in protecting the beta alumina electrolyte tube from the formation of sulfur therearound.

A further object of the invention is to provide a simple method of manufacturing a protective sleeve of the kind described for inhibiting formation of sulfur around the beta alumina electrolyte tube of a sodium sulfur cell.

It is a further object of the present invention to provide such a protective sleeve having substantially reproducible construction and performance characteristics.

The foregoing and other objects of the invention will become more readily evident from the detailed description of a preferred embodiment.

In general there is provided a sodium sulfur cell assembly having a first electrolyte of beta alumina and a second electrolyte of molten polysulfides. Means defining a barrier between the electrolytes serves to separate one from the other to inhibit the formation of sulfur adjacent includes a layer or sleeve of resistive mesh material interposed between the second electrolyte and the barrier means.

Preferrably the layer or sleeve of resistive mesh material is formed of a cotton muslin material heated in a vacuum at a temperature serving to reduce the muslin to a carbon mesh.

In addition, and in general there is provided a method of making a protective sleeve for inhibiting formation of sulfur around the beta alumina electrolyte tube of a sodium sulfur cell so as to delay development of a resistive layer of sulfur therearound. The method inclues the steps of heating a piece of woven natural cloth in a vacuum to a temperature of the order of 400° C. to reduce the piece of cloth to a woven carbon structure. The reduced piece is wrapped about the beta alumina electrolyte tube and then disposed within a body of sulfurous material while positioned about the beta electrolyte tube.

BRIEF DESCRIPTION OF THE DRAWINGS

The single FIGURE of the drawings shows an improved sodium sulfur cell assembly as well as a method of manufacturing protective sleeve elements for inhibiting formation of sulfur about the beta alumina electrolyte tube.

DETAILED DESCRIPTION OF A PREFERRED EMBODIMENT

An improved sodium sulfur cell assembly 10 comprises a container 11 for holding a body 12 of sulfurous material therein as an electrode. The sulfurous material 12 comprises sulfur and carbon felt or mat whereby at ambient temperatures the material consists of a substantially semi-rigid body formed in two elongate halves each with a central groove therein whereby as the body is disposed within container 11 a central bore or opening 13 will be formed therein for purposes described below.

A second container in the form of a beta alumina electrolyte tube 14 and container extension 16 hold a body 17 of sodium as an active electrode material therein. Container 14 includes an elongate ceramic tubular portion inserted into the bore 13 formed by the halves of body 12 of sulfurous material. Means supporting container 14 in bore 13 comprises the ceramic flange 18 secured thereto by means of a glass seal 19 and mechanical seals 21, 22.

The upper end edge margin of container 11 includes a radially outwardly extending flange 23 while the lower end edge margin of container extension 16 is formed with a similar radially outwardly extending flange 24.

Annular clamping plates 26, 27 are drawn together by means of bolts 28 so as to hold them tightly against the mechanical seals 21, 22.

Means for inhibiting the formation of sulfur upon the outer surface of the beta alumina electrolyte tube 14 comprises a sleeve of cotton muslin cloth fired in a vacuum to reduce the muslin to a carbon mesh disposed about electrolyte tube 14.

Accordingly, the method of making a protective sleeve for inhibiting formation of sulfur around the beta alumina electrolyte tube 14 of a sodium sulfur cell serving to inhibit formation of a resistive layer of sulfur therearound includes the steps of heating a piece 29 of woven natural cloth 31 in a vacuum to a temperature of 400° C. to reduce the piece of cloth to a woven carbon structure.

Diagrammatically as shown in the drawing pieces 29 of a 100% cotton muslin material 31 are formed for heating in a vacuum furnace chamber 32 heated by means of the electrical heater coil 33.

Muslin, as is known, is a plain-woven sheer to coarse cotton fabric. Plain-woven pertains to a weave in which the threads interlace alternately thereby providing substantial strength to the carbonized piece 29 after it has been fired.

In firing each piece 29 they have a tendency to curl in the manner shown so as to be readily applied to container 14.

The next step is to wrap the reduced piece 29 about the beta alumina electrolyte tube 14 and then to dispose same within body 12 of sulfurous material. In view of the fact that body 12 is divided into two parts to be assembled to form a bore opening 13 for receiving tubular container 14 it may be desirable to dispose the body of sulfurous material 12 about the sleeve of reduced muslin material and then to insert the combined sulfur body sleeve and tube 14 into container 11 as a unit.

In forming sleeve 34 about the tubular container portion 14 it is sometimes necessary to trim an edge portion 34a in order to provide an appropriate fit. This is particularly true when employing a plurality of sleeves 34.

It has been observed that the provision of a double layer of reduced muslin serves to increase the efficiency significantly over the use of a single layer. Accordingly, a pair of sleeve elements 34 can be disposed one about the other and mounted upon tubular container 14 as shown in the preferred embodiment of the drawing.

Accordingly, by firing the cotton muslin in a vacuum the cotton turns into a plain-woven carbon structure and the vacuum prevents oxidation and burning. Resistance measurements of the cloth indicate that it is still a good insulator, and structurally the reduced cloth is quite strong so as to be easily handled for cutting, wrapping and subsequent placement into the cell.

From the foregoing it will be readily evident that there has been provided an improved sodium sulfur cell assembly and method of manufacturing same characterized by the fired muslin protective layers disposed about the beta alumina electrolyte tube 14.

It has been observed that the discharge product remaining in the original sulfur electrode compartment of a sodium sulfur cell is generally Sodium polysulfide. As the cell is charged, the Sodium ions travel through the solid electrolyte back into the sodium compartment. As the charge continues, more and more sulfur is produced. The purpose of the reduced muslin sleeve 34 is to limit the production of sulfur near the solid electrolyte. Since sleeve 34 is a poor conductor, the electrochemical reaction of the charge takes place in areas of lower resistance. Since more reaction takes place in areas of low resistance, the outer areas of the positive electrode will react first, and sulfur will then form there. Conductivity is maintained by means of the main body of graphite material.

Not until the main body of the cell is nearly all reacted to sulfur does any substantial reaction take place near the solid electrolyte.

In short, sleeve 34 of reduced muslin provides a high resistance that prevents local formation of sulfur near it. The sulfur preferentially forms in the lower resistance areas.

I claim:

1. In a sodium sulfur cell assembly comprising a body of Sodium forming an anode reactant and a body of a sulfurous material forming a cathodic reactant, barrier means interposed between said reactants serving to separate one from the other, and a layer of plain woven mesh material interposed between said Cathodic reactant and said barrier means, said layer having sufficiently high resistance so as to inhibit the oxidation of polysulfides to sulfur alongside said barrier means in favor of oxidation of polysulfides to sulfur in portions of said second named body displaced from said barrier means and unoccupied by said layer.

2. In a sodium sulfur cell assembly according to claim 1 in which said layer comprises cotton muslin heated in a vacuum at a temperature serving to reduce the muslin to a carbon mesh characterized by said sufficiently high resistance.

3. In a sodium sulfur cell assembly according to claim 1 in which said layer of sufficiently high resistive mesh material is wettable by both sulfur and polysulfides and substantially inert to cell atmosphere.

4. In a sodium sulfur cell assembly having a first container for holding a body of sulfurous material as a cathodic reactant therein, a second container for holding a body of sodium as an anode reactant therein, said second container including an elongate portion disposed to extend into said body of sulfurous material, means disposed about said second container for providing a greater resistance about said second container than in the first named body for inhibiting the formation of sulfur around said second container, the last named means comprising a sleeve of cotton muslin cloth fired in a vacuum to reduce the muslin to a carbon mesh having said resistance.

5. In a sodium sulfur cell assembly according to claim 4 in which said sleeve comprises a plurality of layers of said muslin so reduced.

6. In a sodium sulfur cell assembly according to claim 4 in which said cotton muslin is substantially 100% cotton.

7. In a sodium sulfur cell assembly comprising a first container for holding a body of sulfurous material as a cathodic reactant therein, a second container for holding a body of sodium as an anode reactant therein, said second container including an elongate tubular portion, means for disposing said tubular portion of said second container into said body of sulfurous material, and a wrapping of woven carbon material disposed about said tubular portion of said second container for inhibiting the formation of sulfur on the outer surface of said second container, said wrapping occupying only a small fraction of the space defined between said first and second container, said wrapping having a suffciently high resistance so as to inhibit the oxidation of polysulfides to sulfur alongside said second container in favor of oxidation of polysulfides to sulfur in portion of said body of sulfurous material displaced from said wrapping and unoccupied by said wrapping.

8. In a sodium-sulfur cell assembly according to claim 7 in which said wrapping comprises a plain-woven natural fabric reduced in a vacuum furnace to carbon having said sufficiently high resistance.

9. In a cell assembly comprising a first container for holding a body of sulfurous material as a cathodic reactant therein, a second container for holding a body of a sodium material as an anode reactant therein, said second container including an elongate tubular portion, means for disposing said second container into said body of said first material, and a wrapping of woven carbon material disposed about said second container, said wrapping having a sufficiently high resistance so as to inhibit the oxidation of polysulfides to sulfur alongside said tubular portion in favor of oxidation of polysulfides to sulfur in portions of the first named body unoccupied by said wrapping.

10. In a cell assembly according to claim 9 in which said wrapping comprises a plurality of layers of a plain-woven natural fabric reduced in a vacuum furnace to carbon.

* * * * *